T. E. McLAIN AND C. H. SHARP.
DIRECTION INDICATOR FOR VEHICLES.
APPLICATION FILED APR. 14, 1920.
1,365,259.
Patented Jan. 11, 1921.
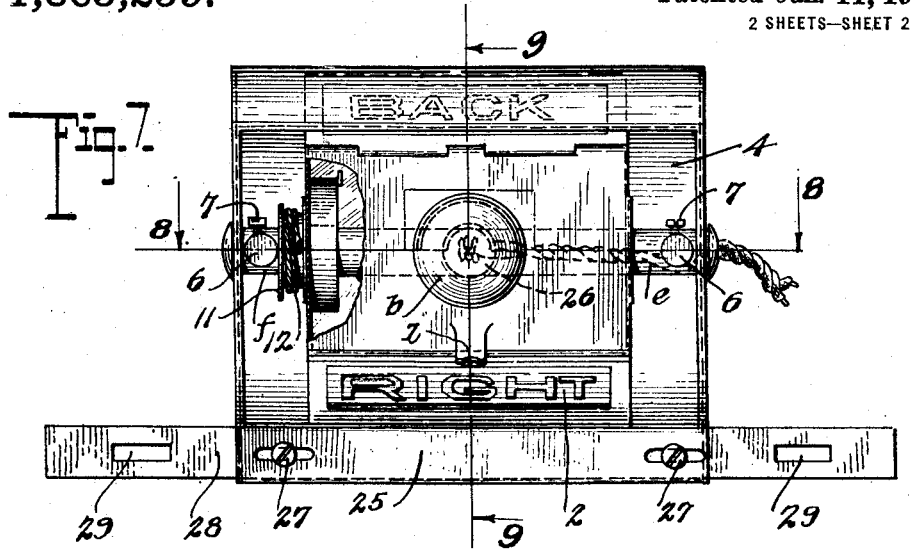
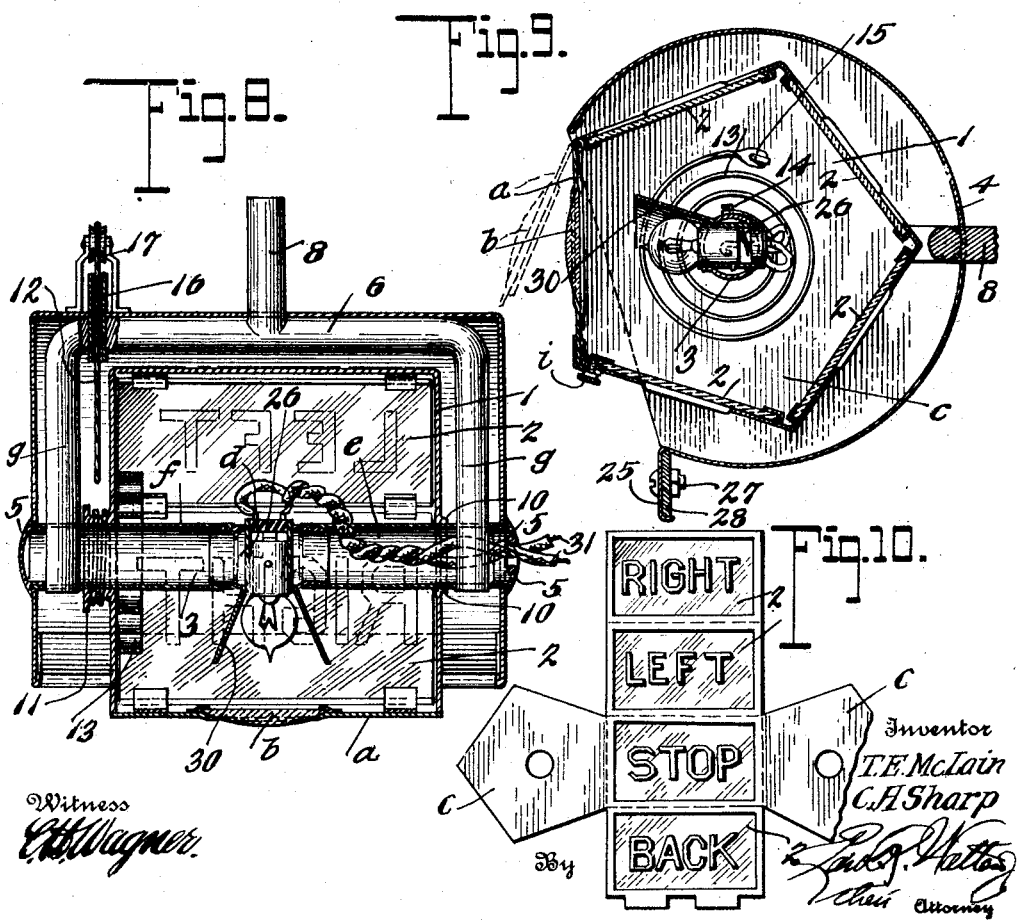

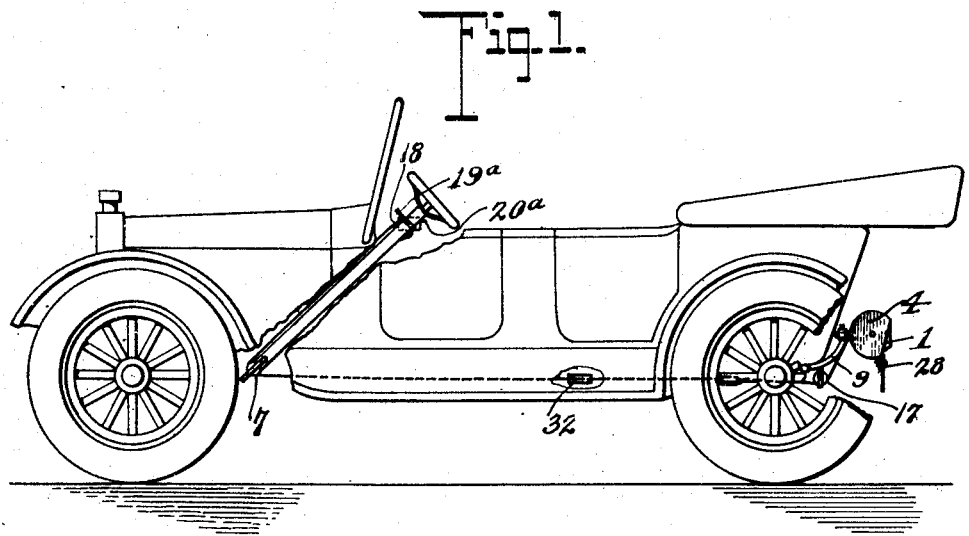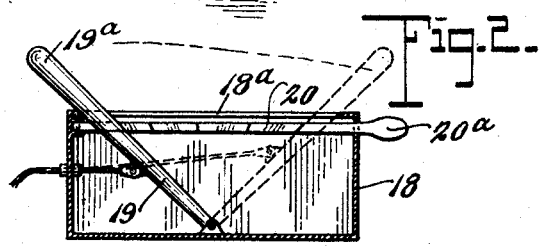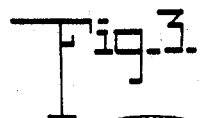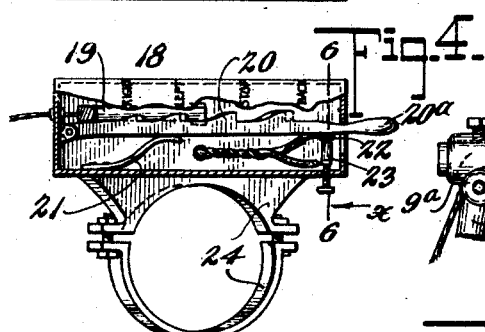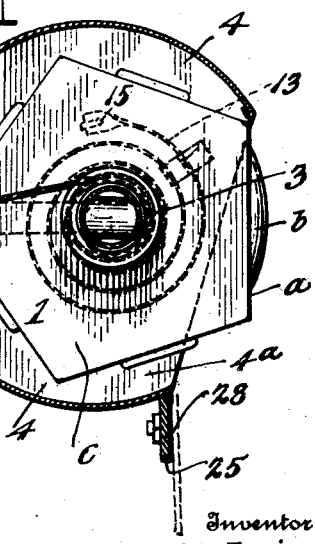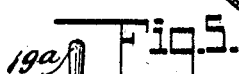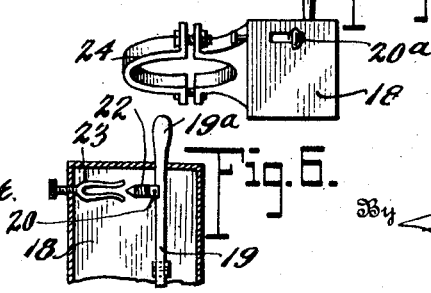

UNITED STATES PATENT OFFICE.

THOMAS E. McLAIN AND CHARLES H. SHARP, OF ELDORADO, KANSAS.

DIRECTION-INDICATOR FOR VEHICLES.

1,365,259.  Specification of Letters Patent.  Patented Jan. 11, 1921.

Application filed April 14, 1920. Serial No. 373,690.

*To all whom it may concern:*

Be it known that we, THOMAS E. McLAIN and CHARLES H. SHARP, citizens of the United States, residing at Eldorado, in the county of Butler and State of Kansas, have invented a new and useful Direction-Indicator for Vehicles, of which the following is a specification.

The present invention is a direction signal for vehicles to be controlled by the operator of the vehicle for indicating to the traffic and pedestrians the further movement of travel of the vehicle.

It is the object of the invention to produce a practical and economical indicator of the kind mentioned, being of such construction that it will be durable and efficient for its purposes.

The invention generally includes a rotatable drum or cylinder having a plurality of indicators or legends thereon which may be selectively exposed to view by an operation of controlling means manipulated by the operator of the vehicle; said means when manipulated will cause an alarm to sound attracting the attention of all approaching traffic.

The invention resides in the sundry details of construction, combination and arrangements of parts, hereinafter specified. In this specification and the annexed drawings, the invention is disclosed in the form which is considered to be the best, but the invention is not limited to such form because it is capable of being embodied in other forms; and it is to be understood that in and by the claims following the description herein, it is intended to cover the invention in whatever form it may be embodied within the scope thereof.

Referring in detail to the drawings:

Figure 1 is a side elevation of an automobile equipped with the present invention.

Fig. 2 is an enlarged detail sectional view taken through the controller box, preferably, secured to the steering wheel of the automobile, Fig. 3 is an enlarged side view of the indicator proper with the side wall of the casing removed, Fig. 4 is a top plan view of the controller box shown in Fig. 2, with a portion of the top wall of the box broken away to illustrate the mechanism therein, Fig. 5 is a rear end view of the controller box looking in the direction of the arrow $x$ of Fig. 4, Fig. 6 is a detail view illustrating the form of contact within the controller box, Fig. 7 is a face view of the indicator proper, Fig. 8 is a horizontal sectional view of the indicator, taken on line 8—8, Fig. 7, Fig. 9 is a vertical sectional view of the indicator taken on the line 9—9, of Fig. 7, and Fig. 10 is a diagrammatic view illustrating the blank from which the rotatable drum of the indicator is made, and also the preferred arrangement of indicators or legends on the drum.

The indicator of the invention may be applied to any desired portion of an automobile, or other vehicle, according to the needs and requirements in each particular instance. For purposes of illustration, the indicator is shown in Fig. 1 as applied to the rear of an automobile.

The indicator comprises a rotatable drum 1, which is preferably polygonal, each face of the drum having an opening which is closed by translucent plates 2 bearing any desired signal or legend thereon. One face of the drum, however, consists of a hinged plate $a$ having a suitable lens $b$ therein to provide the tail light for the automobile, plate $a$ being normally held closed by a set screw or other suitable fastening means $i$, as shown in Fig. 9. Access may be had to the interior of the drum by opening the plate $a$. The drum may be stamped from sheet metal to form a blank as shown in Fig. 10 and bent into shape. The side walls $c$ of the drum are provided with openings through which extends shaft 3. The shaft 3 consists of a middle section $d$ having fitted therein an electric light socket 26, and of end sections $e$ and $f$ having threaded engagement with the respective ends of the intermediate section $d$. The sections are preferably tubular in order to reduce the weight and at the same time giving the shaft the required strength.

The rotatable drum 1 is housed in a casing 4 which is, preferably, cylindrical, but has a portion of its circumferential face or surface cut away, as at 4ª, to provide a display opening before which signals on the drum may be selectively exposed. The ends of the shaft sections e and f may extend through the openings in the sides of the casing 4, as shown particularly in Figs. 7 and 8, and suitable caps 5 may be fitted over the ends of the shaft so as to maintain the casing in position.

The indicator is supported on the vehicle by means of a substantially U-shaped or forked bracket 6 having its free ends extended through suitable openings in the end portions of the shaft 3 and removably secured in position by means of screws 7. The bracket 6 may not take altogether a U-shaped formation so long as it has spaced and substantially parallel arms g arranged on each side of the drum 1 and secured to the shaft, as shown. The bracket 6 has an extension 8 projecting through the casing and adjustably engageable in a socket 9ª in a suitable bracket 9 secured to the vehicle. It will thus be seen that the weight of the indicator is supported by the bracket 6 and maintained in position thereby.

In order to space the side walls c of the drum from the arm j of the bracket 6 so as to avoid scraping or binding, a suitable washer may be interposed therebetween. It is preferred, however, as shown in the drawing, to out-turn the edges of the openings in the side wall c to form annular spacing collars or extensions 10. One of these spacing collars 10 is enlarged to form a pulley or spool 11 having one end of a cord or cable 12 secured thereto and wound thereabout. A pull upon the cord 12, obviously, will cause a rotation of the drum in one direction to successively present the faces of the indicator before the opening in the casing.

The drum is returned to its initial position by a spring 13 secured at one end to the stationary shaft 3, as at 14, and at its other end to a side wall of the casing, as at 15. The spring 13 is preferably a coil spring and wound or placed under tension by the rotation of the drum caused by a pull of the cord 12. The cord 12 extends from the indicator through a suitable guide opening 16 in the casing 4 to a controller box 18 positioned at any desired or convenient point on the vehicle, suitable guides or pulleys 17 being provided where needed to guide the cord 12.

In the controller box 18 is pivotally mounted an operating lever 19 having connection with the end of the cable 12 and having a handle portion 19ª extending from the box through a slot therein. The lever 19 is normally maintained in the full line position of Fig. 1 by the tension on the cord 12 caused by the spring 13. When the lever is in this position the tail light h is positioned before the display opening, and on account of the torsional tension constantly exerted on the drum 1 by the spring 13, this position of the drum 1 will be maintained until the lever is moved in the slot 18ª.

Arranged in the box 18 is a rack bar 20, with which the lever engages and is held thereby in its four other positions which causes the other signal on the drum to be displayed. A suitable scale or position indicator S (corresponding to the signals on the drum) is provided on the box 18 adjacent the lever and with which the latter coöperates in order that the operator can determine which signal is being displayed.

The bar 20 is pivotally mounted at one end while its other end projects through the box and terminates in a handle. A spring 21 constantly keeps the toothed face of the bar 20 in engagement with lever 19, the teeth having one face thereof inclined or beveled in one direction so that when the lever is moved from its initial position shown in full lines in Figs. 2 and 4, it will ride over the teeth of the bar causing oscillatory movement of the latter. The rack bar carries an electric contact 22 engageable with adjustable contact 23 on the box, the contacts being in circuit with a suitable alarm or the horn of the automobile. When the lever is operated from its full line position to move the desired signal before the display opening, the oscillatory movement of the bar will operate the contacts 22 and 23 to open and close an electric circuit for sounding the horn to attract attention of the traffic.

As before stated the bar 20 retains the lever, and consequently the drum, in its adjusted position, but by the operating handle 20ª the bar may be shifted against the action of the spring 21 and the teeth thereof moved out of the path of movement of lever, thus permitting the spring 13 to return it and the drum to normal position.

The controller box 18 may be disposed at any convenient location on the vehicle, but in the present instance is shown as secured to the steering post by means of clamp 24.

The lower edge of the display opening 4ª in the casing is turned outwardly therefrom and inclined, forming a flange to which is adjustably secured, by means of the slot and bolt connections 27 (Fig. 7), a license tag supporting strip 28 having slots 29 in its end portions in which the license tag may be secured. It should be noticed that the display opening 4ª is so cut or positioned that light issuing through one of the under unexposed faces of the drum will illuminate the face of the tag. A reflector 30 is provided over the lamp in the socket 26 in order to reflect the upward rays from the lamp onto the tag.

The electric conductors 31, preferably, extend through the shaft 3 to the socket. Also the cord 12 may have a slack take-up, such as a turn-buckle 32, to maintain the proper adjustment of the operating parts.

Having thus described the invention in its preferred embodiment what is claimed is:

1. A vehicle indicator comprising, a shaft, a drum rotatable on the shaft and having translucent signals thereon, a forked bracket embracing the drum and having the ends thereof secured to the ends of the shaft, a casing surrounding the drum and bracket and having a display opening therein, the extremities of the shaft extending through walls of the casing for supporting the latter and the bracket having a supporting arm extending therefrom through the casing whereby the latter is maintained in position relative to the drum, and means for displaying the signals on the drum before said display opening in the casing.

2. A vehicle indicator comprising, a shaft, a drum rotatable on the shaft and having translucent signals thereon, a forked bracket embracing the drum and having the ends thereof secured to the ends of the shaft, a casing surrounding the drum and bracket and having a display opening therein, a supporting arm extending from the bracket, a spool on one side wall of the drum and surrounding the shaft, a cord wound about the spool and extending from the casing, whereby the drum may be rotated in one direction to selectively display the signals thereon through the display opening, a coil spring within the drum and having one end connected with the latter and its other end connected to the shaft whereby the drum is rotated in an opposite direction and to return it to the initial position, and a lamp mounted on the shaft and within the drum.

3. A direction indicator for vehicles comprising, a shaft, a drum rotatably mounted on the shaft and having a series of signals thereon, a bracket including a pair of substantially parallel arms arranged on each side of the drum and secured to the ends of the shaft, the ends of the drum being closed and having the edges of the openings therein through which the shaft passes outturned to provide annular spacing flanges between the sides of the drum and said arms.

4. A direction indicator as set forth in claim 3, including, in combination, at least one of said flanges providing a spool having a pull cord wrapped thereon, whereby the drum may be rotated.

5. A vehicle indicator comprising a hollow shaft, a drum rotatably mounted on the hollow shaft and having illuminable signal elements therein, a forked bracket embracing the drum and having its ends secured to the end of the shaft, the casing surrounding the drum and bracket having a display opening therein before which said signal elements are displayed, said shaft comprising an intermediate section carrying an illuminating lamp and end sections connected to the ends respectively of the intermediate section and having the extremities extending through the walls of the casing, caps removably fitted in the ends of said extremities of the shaft, whereby the casing is maintained in position, a supporting arm extending from the bracket, and means for rotating the drum of said shaft.

6. A direction indicator for vehicles comprising, a casing having a display opening therein, a drum disposed in the casing and having closed ends, a plurality of translucent signals thereon, a shaft extending through the ends of the drum and secured to the casing, whereby the drum is rotatable in the casing, a substantially U-shaped supporting bracket embracing the drum and having the free ends thereof secured to the ends of the shaft respectively, an extension projecting from the bracket and through the casing for supporting the indicator in position, a spool carried by one side of the drum and surrounding the shaft, a cord wound on the spool and extending through the casing, whereby the drum may be rotated in one direction, a spring in the drum and having one end secured thereto and the other end secured to the shaft for rotating the drum in the opposite direction, a lamp within the drum and supported by the shaft, the signals on the drum being adapted to be successively and selectively displayed by a pull on the cord, and means for limiting the action of said spring whereby one of the signals on the drum is normally displayed.

In testimony whereof we have hereunto set our hands.

THOMAS E. McLAIN.
CHARLES H. SHARP.